United States Patent [19]
Warner

[11] Patent Number: 5,180,278
[45] Date of Patent: Jan. 19, 1993

[54] SURGE-TOLERANT COMPRESSION SYSTEM

[75] Inventor: John L. Warner, Simsbury, Conn.

[73] Assignee: United Technologies Corp., Hartford, Conn.

[21] Appl. No.: 582,273

[22] Filed: Sep. 14, 1990

[51] Int. Cl.$^5$ .............................................. F04D 27/02
[52] U.S. Cl. ........................................ 415/27; 60/682; 62/402
[58] Field of Search .................... 60/650, 682; 62/172, 62/402; 415/26, 27, 32

[56] References Cited

U.S. PATENT DOCUMENTS

| | | | |
|---|---|---|---|
| 3,047,210 | 7/1962 | Best | 415/27 |
| 3,768,921 | 10/1973 | Brown et al. | 415/116 |
| 4,428,194 | 1/1984 | Stokes et al. | 415/27 X |
| 4,533,293 | 8/1985 | Hendriks | 415/117 |
| 4,627,788 | 12/1986 | Keyes, IV et al. | 415/27 X |

Primary Examiner—Allen M. Ostrager

[57] ABSTRACT

In compression systems, a portion of the compressor outlet flow (28) is extracted and introduced through a surge nozzle (52) into a plenum (48) upstream of the compressor (14). The surge nozzle (52) is oriented so as to introduce in the fluid in the plenum (48) a vortex having the same axis and direction of rotation as the compressor rotor (54).

14 Claims, 1 Drawing Sheet

SURGE-TOLERANT COMPRESSION SYSTEM

TECHNICAL FIELD

This invention relates to air cycle machines having compressors.

BACKGROUND ART

Air cycle environmental control systems are typically employed to cool, dehumidify, pressurize, and otherwise condition air in aircraft passenger cabins. In these systems, supply air, which is ambient air compressed by either the engine or the auxiliary power unit, is delivered to a compressor. The temperature of the compressor outlet air is then lowered in a ram-air cooled heat exchanger before it is expanded to cabin pressure in a turbine, not only producing the chilled air needed to satisfy aircraft cooling requirements, but generating the power used to drive the compressor as well.

As the aircraft ascends and ambient air pressure decreases, since the compression ratio of the supply air source is relatively constant, the pressure of the supply air also falls. When the pressure of the supply air entering the compressor falls, the pressure at the turbine inlet drops as well. Since the pressure at the turbine outlet, cabin pressure, varies only slightly with altitude, when the pressure at the turbine inlet drops, less power is extracted by the turbine. With less power available to further compress supply air, turbine inlet pressure decreases even more. At every ambient air pressure, therefore, there is a system equilibrium point at which the amount of power absorbed by the compressor equals the amount of power extracted by expanding the air exiting the compressor to cabin pressure.

As the power level of the system fluctuates in response to changing ambient air pressure, the pressure and flow rate through the system change as well. The compressor and turbine are therefore chosen such that, at some baseline altitude, the temperature and mass flow rate of the air exiting the turbine meet or exceed some predetermined cooling capacity levels. As cooling requirements are typically most stringent when the aircraft is on the ground, in most cases this baseline altitude is selected to be at or near sea-level altitude. At low altitudes, then, the environmental control system satisfies all aircraft cooling needs. At higher altitudes, however, where the system operates at pressures below the design pressure, the mass flow rate of air exiting the system, and hence its cooling capacity, is decreased. With some system configurations, cooling capacity at these altitudes can be insufficient to adequately cool the aircraft. With this approach, therefore, to satisfy cooling requirements at low altitudes, cooling capacity is sacrificed at the high cruise altitudes encountered during the majority of the flight.

To improve cooling capacity during high altitude flight, the compressor and turbine can instead be selected to ensure that the system satisfies aircraft cooling requirements during low pressure operation instead of high. Adequate cooling is then realized during a higher percentage of the flight time, since low altitude conditions are encountered only during take off and landing maneuvers. During these maneuvers, however, the supply air pressure rises, exceeding the system design pressure. Since the flow area of the system is fixed, the flow rate through the system increases excessively. To avoid this, some mechanism must be included to limit supply pressure. If the supply air pressure is limited, heat exchanger performance, and hence size, must be increased to compensate for the decline in turbine pressure ratio and resultant temperature drop. With this approach, there must then be a compromise between excessive flow at low altitudes and system size.

To improve system flow rate, and hence cooling capacity, when the pressure of the ambient air falls at high operation altitudes, some systems employ turbines with two sets of inlet nozzles. The flow area of the nozzle on a turbine is typically fixed. In these dual-nozzle turbine configurations, however, air is delivered, through either two separate scrolls or a single divided scroll, to two sets of alternating nozzles, one having a larger flow area than the other. To alter the flow area of the system during flight, a valve in the scroll supplying air to the smaller nozzle set is opened or closed. The compressor and turbine in dual-nozzle systems are chosen such that the system cooling capacity at sea-level altitude meets or exceeds, when the valve in the smaller nozzle scroll is closed, cooling requirements. When the aircraft ascends to higher altitudes, the valve in the smaller nozzle scroll opens, allowing an increased mass flow rate of air to pass through the system, improving high altitude cooling capacity. However, as the flow characteristics of the turbine change, so does the efficiency of the compressor. When the valve in the scroll opens, compressor efficiency falls. In this configuration, then, although overall cooling capacity increases when the scroll valve opens, disproportionately more supply pressure is needed to generate that cooling flow.

The compressor and turbine in a dual-nozzle system can also be sized for high-altitude operation with the scroll valve open, instead of low-altitude operation with the scroll valve closed. A surge problem, however, results when this technique is used. As the aircraft descends, the pressure of the supply air, and hence the flow through the compressor, increases. When the pressure of the supply air rises above a predetermined level, the scroll valve closes. Not only, then, does the compressor pressure ratio increase at lower altitudes, but, since the system flow area is reduced, the flow rate through the system decreases as well. At this point, therefore, the flow rate through the compressor is too low, given the pressure ratio, to prevent air flowing over the compressor blades from stalling, and the compressor surges.

DISCLOSURE OF INVENTION

Objects of the invention include both reducing the power absorbed by a compressor and decreasing, for a given pressure ratio, the flow rate at which the compressor surges.

According to the present invention, a portion of the compressor outlet flow is introduced upstream of the compressor inlet so as to induce a vortex having the same axis and direction of rotation as the compressor.

In compression systems employing the present invention, flow is extracted from the airstream exiting the compressor, decreasing the net flow restriction downstream of the compressor. As flow restriction drops, a greater flow rate of air passes through the compressor, improving surge margin. Since compressor outlet flow recirculates to the compressor inlet, the flow rate through the compressor increases without a corresponding increase in the flow rate of the supply air entering the system.

Additionally, the cycle efficiency of systems employing the present invention is greater than the cycle efficiency of prior art systems in which extracted flow is vented to outside ambient air. By virtue of being compressed by both the engine (or the auxiliary power unit) and the compressor, energy is stored in the extracted flow. If the extracted flow is vented, this energy is lost. By using the pressure drop across the compressor outlet and inlet to accelerate the extracted flow and induce a with-rotation preswirl in the inlet, however, a portion of the compression energy in the extracted flow is recovered.

Employing extracted compressor outlet air to increase the tangential component of the flow entering the compressor also favorably changes the surge characteristics of the compressor. For a given pressure ratio, compression systems employing the present invention can deliver, without causing the compressor to surge, a lower flow rate of air than systems that do not include the present invention. Alternatively, the present invention allows compressors to operate at pressure ratio and flow conditions which would otherwise cause surge. A smaller portion of the compressor outlet air therefore need be extracted and introduced into the compressor inlet, resulting in lower enthalpic energy loss and further improved overall cycle efficiency.

In an environmental control system employing both the present invention and a dual nozzle turbine, therefore, the compressor is optimized for high altitude performance. Since the aircraft into which these systems are installed typically operate for the greatest amount of time at high altitude, the system therefore nearly always functions at or near its design pressure. When the system is supplied with higher pressure air at lower altitudes, and flow rate through the system is reduced when the smaller nozzle area is selected, the present invention then ensures that compressor surge is avoided and cooling capacity maintained.

The foregoing and other objects, features, and advantages of the present invention will become more apparent in the light of the following detailed description of exemplary embodiments thereof, as illustrated in the accompanying drawings.

BEST MODE FOR CARRYING OUT THE INVENTION

Figure 1:
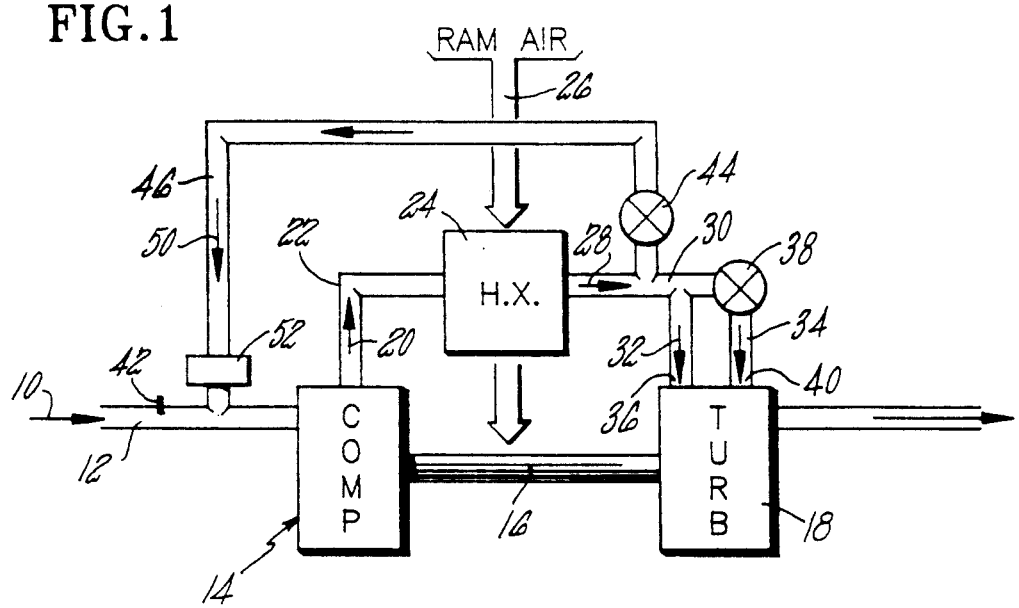
FIG. 1 is a schematic diagram of an air cycle machine incorporating the present invention.

Referring now to FIG. 1, supply air 10 is delivered, via a duct 12, to a radial-flow compressor 14 connected, via a shaft 16, to a radial-flow turbine 18. Pressurized ambient air, bled from either the gas generator section of an aircraft gas turbine engine (not shown) or an auxiliary power unit (not shown) typically serves as the source for this supply air 10. Compressor outlet air 20, heated by the compression step, passes, via a duct 22, to the warm path of a heat exchanger 24. To chill the compressor outlet air 20, cooler ambient ram air 26 is forced through the cooling path of the heat exchanger 24. After exiting the warm path of the heat exchanger 24, cooled compressor outlet air 28 flows, via a duct 30, to the entrance of the turbine 18.

Flow entering the turbine 18 passes through one or both of two nozzle scrolls 32, 34. The first nozzle scroll 32 continuously supplies air to a first set of turbine nozzles 36. Flow through the second nozzle scroll 34 is controlled by a nozzle valve 38. Only when this nozzle valve 38 is open does air flow to a second set of turbine nozzles 40. The two sets of turbine nozzles 36, 40 encircle the turbine rotor at the same axial location, directing air radially inward to impinge on the leading edges of the turbine blades. For uniform flow, each individual nozzle is flanked by one from the other nozzle set. In most applications, the flow area of the first nozzle set 36 is approximately twice the flow area of the second nozzle set 40. When the nozzle valve 38 closes, therefore, the total flow area reduces by a third.

The state of the nozzle valve 38, and therefore the total flow area of the machine, is determined by the pressure of the supply air 10. As the aircraft (not shown) into which this air cycle machine is installed ascends, the pressure of the supply air 10 falls. When the pressure of the supply air 10, as indicated by a pressure sensor 42, falls below a predetermined level, the nozzle valve 38 opens, and air passes through both nozzle sets 36, 40. When the pressure sensor 42 indicates that supply air 10 pressure has increased above the predetermined level, the nozzle valve 38 closes, and flow entering the turbine 18 passes only through the first nozzle set 36.

Opening and closing the nozzle valve 38 in response to changes in the pressure of the supply air 10 alters the flow characteristics of the air cycle machine. As the flow characteristics and supply air 10 pressure vary, so do the pressure drop across, and flow rate through, the compressor 14 and turbine 18. During a typical flight, the aircraft operates for the greatest length of time at a high cruise altitude. The compressor 12 is therefore optimized for high-altitude flight with the nozzle valve 38 open, and the machine functions at or near its design pressure for nearly the entire flight.

Figure 2:
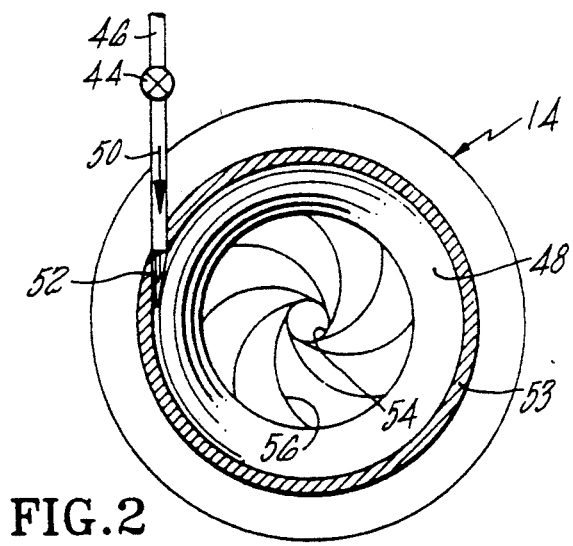
FIG. 2 is a broken away sectional view, taken on the line 2—2 in FIG. 3, showing both the orientation and the radial location of a surge flow line connected to a plenum upstream of a compressor.

Referring to FIGS. 1 and 2, when the aircraft operates at altitudes sufficiently low that the pressure of the supply air 10 rises above the predetermined level, the nozzle valve 38 closes. Closing the nozzle valve 38 under these conditions causes the flow rate through the compressor 14 to decrease sharply. Given the compressor pressure ratio, this drop in flow may be sufficient to cause compressor surge. To avoid this, when the nozzle valve 38 closes, a surge bypass valve 44 in a surge duct 46 opens, connecting the duct 30 at the outlet of the warm path of the heat exchanger 24 to an inlet plenum 48 supplying flow to the compressor 14. According to the present invention, a surge nozzle 52 located in the outlet of this surge duct 46 meters the volume of surge flow 50 passing into the plenum 48. Surge flow 50 is therefore only a portion of the cooled compressor outlet air 28. The flow area of the surge nozzle 52, selected to match expected operating conditions, is typically significantly smaller than the flow area of the second nozzle set 40. When the nozzle valve 38 closes and the surge bypass valve 44 opens, therefore, the total flow area downstream of the compressor is reduced, and the net flow restriction of the machine is increased.

Referring now to FIG. 2, the surge duct 46 and nozzle 48 connect tangentially to a wall of the plenum 48 supplying flow to the compressor 14. Before passing through the surge nozzle 52, the surge flow 50 is considerably higher in pressure than the supply air 10 at the outlet of the surge nozzle 52 in the plenum 48. As surge flow 50 passes through the nozzle, therefore, it accelerates. Since the nozzle 52 is oriented tangentially to the plenum wall 53, the accelerated surge flow 50 exiting the surge nozzle 52 flows circumferentially through the plenum 48. As it mixes with the supply air 10 flow, the accelerated surge flow 50 transfers angular momentum to the supply air 10, causing the mixed flow in the plenum to swirl, in a vortex, about the axis of rotation of the compressor rotor 54.

As a result of the induced swirling, the supply air 10 now has a tangential component prior to entering the compressor 14, thus reducing the relative velocity between the blades 56 and air at the compressor face. The compressor therefore requires less energy to tangentially accelerate the incoming supply air 10. Since the compressor 14 absorbs all power produced by the turbine 18, when less energy is needed to tangentially accelerate the supply air 10, compressor speed rises. With increased compressor speed, the pressure of air exiting, and hence the pressure ratio across, the compressor 10 also rises.

Employing extracted compressor outlet air to increase the tangential component of the flow entering the compressor 14 also changes the surge characteristics of the compressor 14. Compressors surge when airflow over the compressor blades 56 stall. Stall occurs when the effective angle of attack of flow over the blades 56 increases above some point. For a given flow rate and compressor speed, as the tangential component of the air flowing over the blades 56 increases, the effective angle of attack decreases. As swirling air enters the compressor 14 and effective angle of attack decreases, therefore, compressor surge margin increases.

Figure 3:
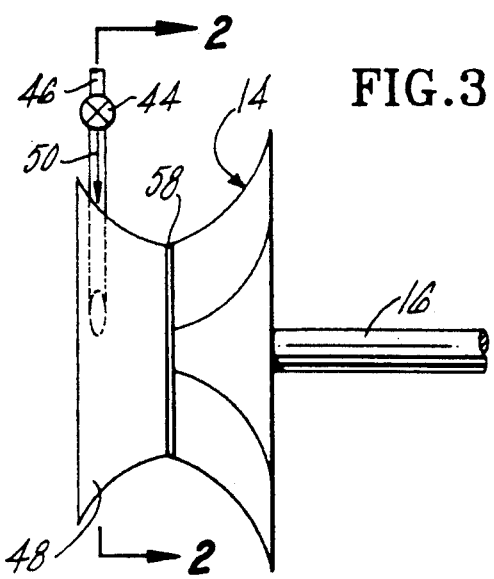
FIG. 3 is a partially broken away side view showing the preferred axial location of the surge flow line connected to the plenum.

Referring to FIGS. 2 and 3, the surge duct 46 and nozzle 52 are axially located to introduce surge flow 50 into a region of the plenum 48 having a larger diameter than the inlet 58 of the compressor 14. Since the angular momentum of the vortex flow is conserved, as it passes through the plenum 48 and becomes further radially constricted, it swirls more quickly. The angular velocity of the vortex flow is therefore greater when it enters the compressor 14 than if the flow had been introduced directly into the inlet 58. Introducing surge flow into a region with a larger diameter than the compressor inlet 58 therefore amplifies the benefits of the vortex, reducing further the flow rate at which the compressor surges.

Although the invention has been shown and described with respect to exemplary embodiments thereof, it should be understood by those skilled in the art that various changes, omissions, and additions may be made therein and thereto, without departing from the spirit and scope of the invention.

I claim:

1. A surge-tolerant gas compression system, comprising:
    a gas compressor having an inlet and an outlet;
    means for extracting a surge flow portion of the compressor outlet flow;
    means for delivering said surge flow to a gas receiving inlet plenum upstream of said inlet of said compressor;
    a surge bypass valve, included in said delivering means, operable between a first, open flow state and a second, closed flow state; and
    means for introducing said surge flow into said plenum such that said surge flow induces a vortex in the gas received in said plenum, said vortex having the same axis and direction of rotation as the rotor of said compressor.

2. The system according to claim 1 wherein said compressor is a radial-flow compressor.

3. The system according to claim 1, further comprising a surge nozzle disposed in said delivering means.

4. The system according to claim 1 wherein said introducing means is oriented to discharge surge flow parallel to a wall of said plenum.

5. The system according to claim 1 wherein said plenum is annular and decreases in diameter approaching the compressor inlet, and flow is introduced into a region of said plenum having a larger diameter than the inlet of said compressor.

6. An air cycle machine comprising:
    a gas turbine;
    a gas compressor having an inlet and an outlet, said compressor driven by said turbine;
    means for extracting a first portion of the compressor outlet flow;
    means for extracting a second portion of the compressor outlet flow;
    means for delivering said first portion to said gas turbine;
    means for delivering said second portion to a gas receiving inlet plenum upstream of said inlet of said compressor;
    a surge bypass valve, included in said delivering means, operable between a first, open flow state and a second, closed flow state; and
    means for introducing said surge flow into said plenum such that said surge flow induces a vortex in the gas received in said plenum, said vortex having the same axis and direction of rotation as the rotor of said compressor.

7. The system according to claim 6 wherein said compressor is a radial-flow compressor.

8. The system according to claim 6, further comprising a surge nozzle disposed in said delivering means.

9. The system according to claim 6 wherein said introducing means is oriented to discharge surge flow parallel to a wall of said plenum.

10. The system according to claim 6 wherein said plenum is annular and decreases in diameter approaching the compressor inlet, and flow is introduced into a region of said plenum having a larger diameter than the inlet of said compressor.

11. The system according to claim 6, further comprising means for reducing the temperature of flow downstream of said outlet of said compressor.

12. The system according to claim 6 wherein said turbine has a first and a second set of inlet nozzles.

13. The system according to claim 12 wherein said turbine has a nozzle valve, said nozzle valve operable between a first, open flow state providing flow to both said first and said second sets of nozzles, and a second, closed flow state providing flow only to said first nozzle set.

14. The system according to claim 13, further comprising a flow-regulating surge nozzle disposed in said delivering means, said surge nozzle having a flow area smaller than the flow area of said second nozzle.

* * * * *